United States Patent [19]

Suganuma et al.

[11] Patent Number: 5,298,819
[45] Date of Patent: Mar. 29, 1994

[54] WINDING ARRANGEMENT FOR A TUBULAR LINEAR MOTOR

[75] Inventors: Manabu Suganuma, Yamato; Keiichi Kohroki, Aichi; Takayuki Mizuno; Masayukii Kawaguchi, Aichi, all of Japan

[73] Assignee: Otis Elevator Company, Farmington, Conn.

[21] Appl. No.: 980,044

[22] Filed: Nov. 23, 1992

[30] Foreign Application Priority Data

Nov. 26, 1991 [JP] Japan .................... 3-309630

[51] Int. Cl.$^5$ ............................. H02K 41/00
[52] U.S. Cl. .................................... 310/12
[58] Field of Search ..................... 310/12, 13, 14

[56] References Cited

U.S. PATENT DOCUMENTS 5,128,569 6/1992 Gladish .................. 310/12

FOREIGN PATENT DOCUMENTS 0073867 4/1988 Japan ..................... 310/12
0047262 2/1989 Japan ..................... 310/12

Primary Examiner—R. Skudy
Assistant Examiner—Judson H. Jones
Attorney, Agent, or Firm—Richard D. Getz

[57] ABSTRACT

A tubular linear motor is provided having a secondary and a primary. The primary consists of a plurality of laminations and coils. Each lamination has a width with a plurality of notches removed therefrom, and a first end and second end, with a length extending therebetween. When the laminations are aligned, the notches collectively form channels which receive the coils. The plurality of coils are arranged in poles, each pole having a discrete number of coils corresponding to the number of phases in the current driving the linear motor, or a multiple thereof. A percentage of the coils corresponding to the phase closest to the first end of the primary, is positioned at the second end of the primary.

7 Claims, 5 Drawing Sheets

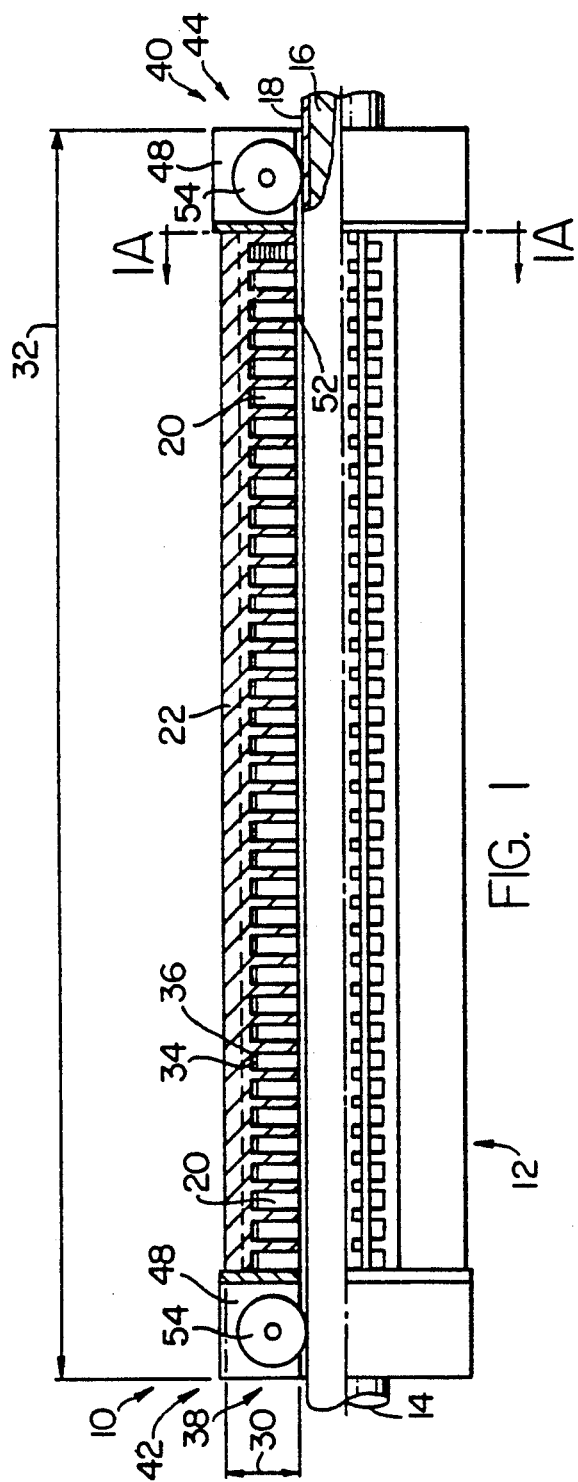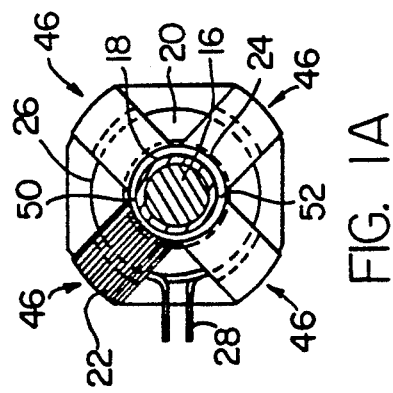

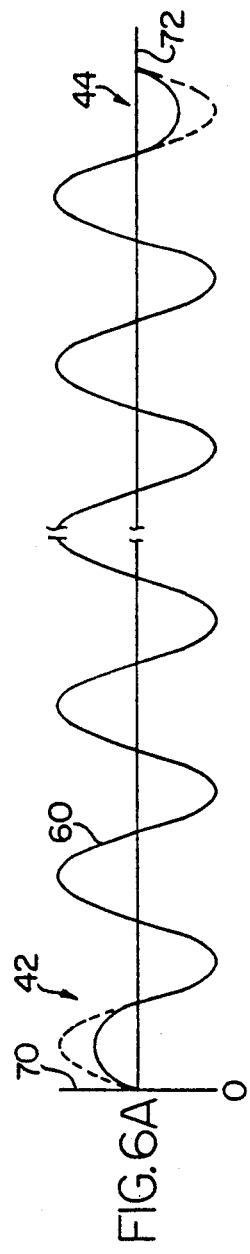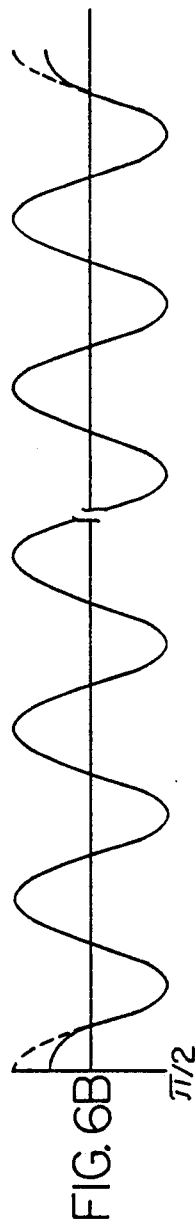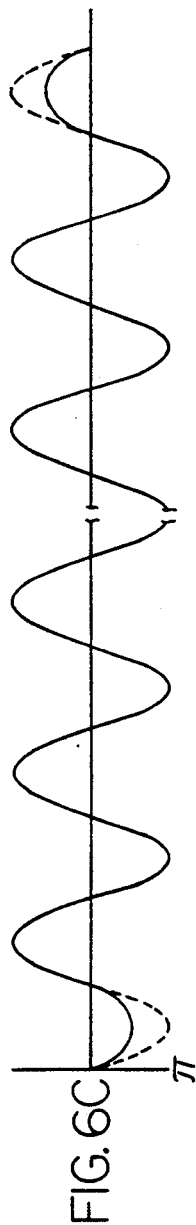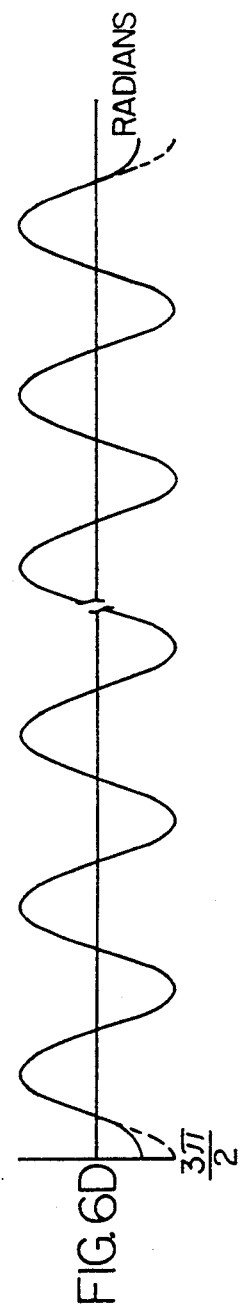

WINDING ARRANGEMENT FOR A TUBULAR LINEAR MOTOR

DESCRIPTION

1. Technical Field

This invention relates to tubular linear motors, and more specifically to winding arrangements for tubular linear motor primaries.

2. Background Art

Tubular linear motors, or TLIM's, having a primary and a secondary, provide a means for linear propulsion which can be used in a variety of different ways. The secondary typically consists of a cylindrical body of ferromagnetic material having a surface covered by a highly conductive material. That surface faces the primary, but is separated from the primary by an air gap.

The primary consists of a plurality of coils and thin ferromagnetic laminations. The laminations have a width and a length defined by a first and a second end. A series of notches are formed in the width of each lamination. When the laminations are aligned side by side, the notches collectively form channels which extend in a direction perpendicular to the length of the laminations. The coils are received within the channels.

A number of different lamination arrangements are known and may be used in the design of a TLIM. One embodiment uses four separate groups of laminations symmetrically arranged around the coils and cylindrical secondary. Each coil is received by the aligned channels of the lamination groups. A pair of annular flanges, one on each end of the laminations, hold the groups and the coils together. In addition, a number of bolt and nut assemblies passing through the laminations are used to hold each individual group together. The secondary is free to move axially within the center of the coils.

When current is introduced into the coils, a magnetic field is created in a plane perpendicular to the direction of the current. Since the lengths of the laminations are theoretically perpendicular to the coils, the magnetic field perpendicular to the current travels through the laminations along the length of the laminations. The magnetic field accessing the laminations also accesses the ferromagnetic material of the secondary, thereby causing induced currents to travel in the highly conductive layer on the surface of the secondary. As a result, an attractive and a thrust force is experienced by the primary and secondary relative to one another. The thrust force produces the linear motion sought.

The magnitude of the forces created between the primary and secondary depends on a number of variables, including the number of coils in the primary and more specifically how they are arranged in the primary. The number of coils in the primary is directly related to the number of poles in the motor and the number of phases present in the current passed through the coils. For example, if the current used is three phase alternating current (AC current) and the motor is a two pole motor, the motor will have six coils. By convention, when using three phase AC current, the three phases of the current are designated "U", "V", and "W". In the aforementioned example, therefore, the coil arrangement can be described as UVW$\overline{\text{UVW}}$ (The bars over the latter three coils by convention designate current traveling in a direction opposite that in the first three coils). In a four pole motor, for example, the coil arrangement would be UVWUVW$\overline{\text{UVWUVW}}$, and so forth.

It is also known in the art that the number of coils in each pole may be a multiple of the number of phases in the current. For example, a two-pole motor could have a coil arrangement that looks like UUVVWW$\overline{\text{UUVVWW}}$, if the number of coils per phase per pole (designated as "q") is equal to two (q=2). Similarly, a two pole motor having a q=3 would have a coil arrangement that looks like UUUVVVWWW$\overline{\text{UUUVVVWWW}}$ and so forth. The advantage to having a "q" equal to 2,3, or 4, stems from the sinusoidal nature of alternating current and therefore the sinusoidal nature of the resulting magnetic field as well. Increasing the "q" to 2,3, or 4 causes the wave describing the magnetic field to more closely approximate a pure sinusoidal wave. The result is a smoother operating motor.

TLIM's lack the symmetry enjoyed by rotary motors. Specifically, the cylindrical geometry of a rotary motor provides an endless loop through which the magnetic wave travels. TLIM's, in contrast, have a defined beginning and end. For illustrative purposes, it can be said that the alternating currents, and therefore the magnetic field, travel from a first end of the primary to a second end, at which time the process is repeated. It is known in the art that this lack of symmetry causes some problems not appreciably present in rotary motors, such as fluctuations in thrust also known as "thrust ripple". Fluctuations in thrust cause undesirable vibrations in the TLIM.

The thrust in a linear motor is directly related to induced currents traveling in the highly conductive layer on the surface of the secondary, which are a product of the magnetic flux emanating from the primary. A diminution of magnetic flux emanating from the primary, therefore, causes a proportionate diminution of the induced currents and consequent thrust of the linear motor. In any linear motor using AC current, or direct current (DC) controlled to act like AC current, the magnetic flux attributable to the excitation of a particular phase at a particular pole will be the sum of the magnetic flux specifically emanating from the coil(s) of that phase and the magnetic flux emanating from adjacent phases excited to a different extent at that point in time. In an infinitely long TLIM or a rotary motor, the magnetic field produced by each phase will always include a contribution from the other phases. The problem with a TLIM of finite length, however, is that the first phase excited on the first end of the primary, which we have designated as "U", gets no contribution from the prior phases because there are no prior phases. As a result, the magnitude of magnetic flux attributable to the "U" phase is less at certain points of time than at others. Hence, the proportionately related motor thrust is also less at certain points of time than at others, thereby creating "thrust ripple".

DISCLOSURE OF THE INVENTION

It is, therefore, an object of the present invention to provide a tubular linear motor having a secondary and a primary with a winding arrangement capable of minimizing or eliminating fluctuations in thrust.

According to the present invention, a tubular linear motor is provided having a secondary and a primary. The primary consists of a plurality of laminations and coils. Each lamination has a width with a plurality of notches removed therefrom, and a first end and second end, with a length extending therebetween. When the laminations are aligned, the notches collectively form channels which receive the coils. The plurality of coils are arranged in poles, each pole having a discrete number of coils corresponding to the number of phases in the current driving the linear motor, or a multiple thereof. A percentage of the coils corresponding to the phase closest to the first end of the primary, is positioned at the second end of the primary.

An advantage of the present invention is that a percentage of the coils corresponding to the first phase closest to the first end of the primary is positioned at the second end of the primary. As a result, the magnitude of flux density attributable to that first phase is made more consistent at every point in time, thereby minimizing or eliminating the fluctuation in thrust caused by the fluctuating magnetic field.

These and other objects, features and advantages of the present invention will become more apparent in light of the detailed description of the best mode embodiment thereof, as illustrated in the accompanying drawings.

BRIEF DESCRIPTION OF THE DRAWINGS

FIG. 1 is a sectional view of a tubular linear motor.
FIG. 1A is a sectional view of FIG. 1.
FIGS. 6A–6D show a wave representing the magnitude of the magnetic flux attributable to a phase in a TLIM using the winding arrangement of the present invention as a function of time.

BEST MODE FOR CARRYING OUT THE INVENTION

Figure 2:
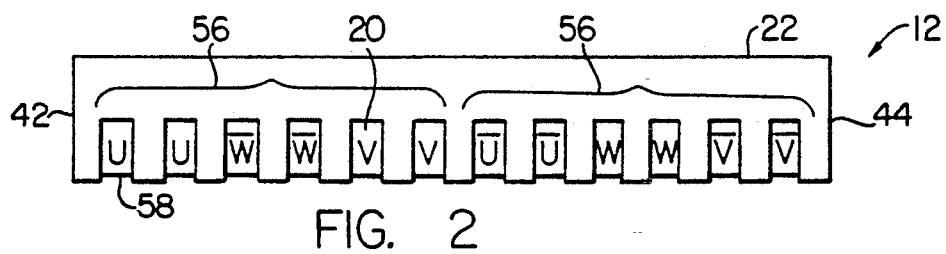
FIG. 2 shows a conventional coil arrangement for a tubular linear motor having a q equal to 2.

Referring to FIGS. 1 and 1A, a tubular linear motor 10, or TLIM, is shown having a primary 12 and a secondary 14. The secondary 14 consists of a cylindrical body 16 of ferromagnetic material having a surface covered by a highly conductive material 18. The primary 12 consists of a plurality of coils 20 and thin ferromagnetic laminations 22. Each coil 20 is disc-shaped having an inner 24 and outer 26 diameter. A pair of leads 28 extend out from each coil 20 for attachment to the current source (not shown). The coils 20 are comprised of a plurality of conductive wires (see FIGS. 3 and 4).

Each lamination 22 has a width 30 and a length 32. A series of notches 34 are removed from the width 30 of each lamination 22. When the laminations 22 are aligned side by side, the notches 34 collectively form channels 36 which extend in a direction perpendicular to the length 32 of the laminations 22. Each lamination 22 has a first end 38 and a second end 40, with the length 32 of the lamination 22 extending therebetween. The first and second ends 38,40 of each lamination 22 collectively form a first 42 and second end 44 of the primary 12, respectively.

The laminations 22 may be arranged in four separate groups 46 aligned with one another and symmetrically positioned around the coils 20 and cylindrical secondary 14; i.e. one at every 90 degrees as is shown in FIG. 1A. The outer diameter 26 of each coil 20 is received by the aligned channels 36 of the lamination groups 46. A pair of annular flanges 48, having a binding means (not shown), one on each end of the laminations 22, hold the laminations 22 and the coils 20 together as is known in the art. In addition, a number of bolt and nut assemblies (not shown) pass through each lamination group 46 to bind the individual laminations 22 together into a group 46 as is known in the art.

The secondary 14 is received within the inner diameter 24 of the coils 20. Because the inner diameter 24 of the coils 20 is greater than the outer diameter 50 of the secondary 14, an air gap 52 exists between the secondary 14 and the primary 12 when the secondary 14 is centered in the middle of the primary 12. A set of rollers 54 are attached to each annular flange 48. The rollers 54 facilitate movement between the secondary 14 and the primary 12 and ensure that the secondary 14 remains centered within the primary 12. In the embodiment shown, the primary 12 is allowed to move relative to the secondary 14 which is fixed. In other embodiments, the primary 12 may be fixed and the secondary 14 movably mounted.

Figure 2A:
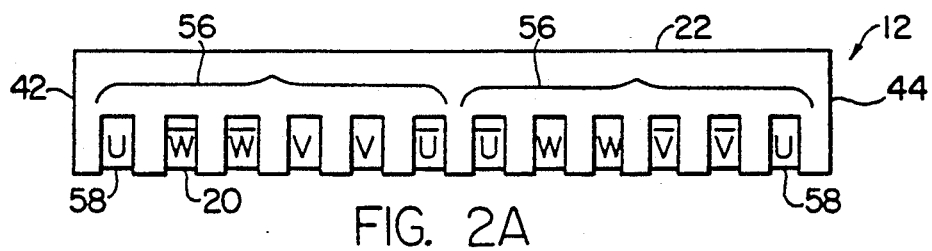
FIG. 2A shows the coil arrangement of the present invention for a tubular linear motor having a q equal to 2.

Referring to FIGS. 2 and 2A, the number of coils 20 in the primary 12 is directly related to the number of poles 56 in the linear motor 10 and the number of phases present in the current passed through the coils 20. In a two pole motor powered by three phase AC current with a "q" equal to two, a conventional coil arrangement could be described as UUVVWW$\overline{\text{UU}}$$\overline{\text{VV}}$$\overline{\text{WW}}$ (see FIG. 2). In the present invention, however (see FIG. 2A), the coil arrangement for the same type motor would be described as UVVWW$\overline{\text{UU}}$$\overline{\text{VV}}$$\overline{\text{WW}}$U. One of the coils of the "U" phase 58 of the pole closest to the first end 42 of the primary 12 (or the "first pole") is removed and relocated to the second end 44 of the primary 12.

Figure 3:
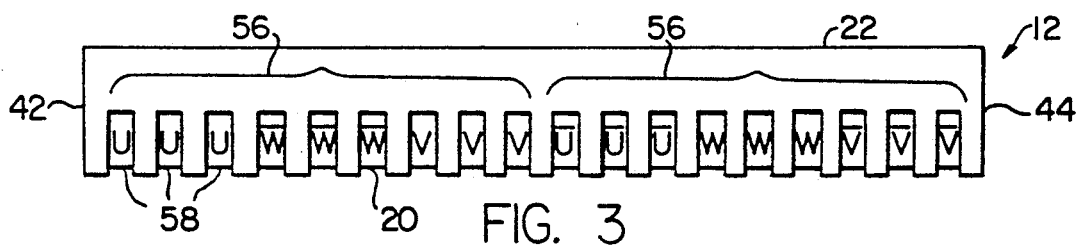
FIG. 3 shows a conventional coil arrangement for a tubular linear motor having a q equal to 3.
Figure 3A:
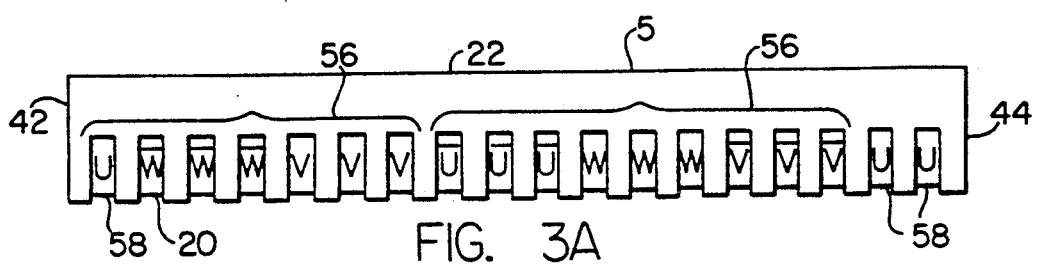
FIG. 3A shows the coil arrangement of the present invention for a tubular linear motor having a q equal to 3.
Figure 4A:
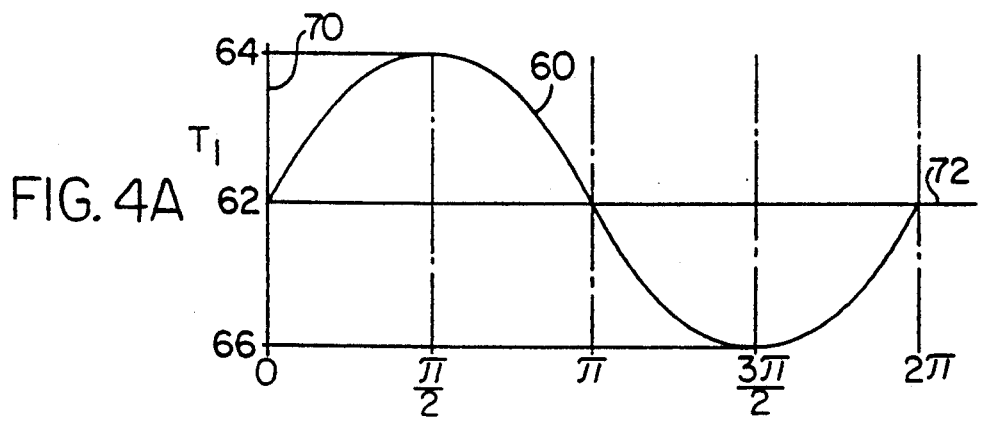
FIGS. 4A–4D show a wave representing the magnitude of the magnetic flux attributable to a phase in an infinitely long TLIM as a function of time.
Figure 4B:
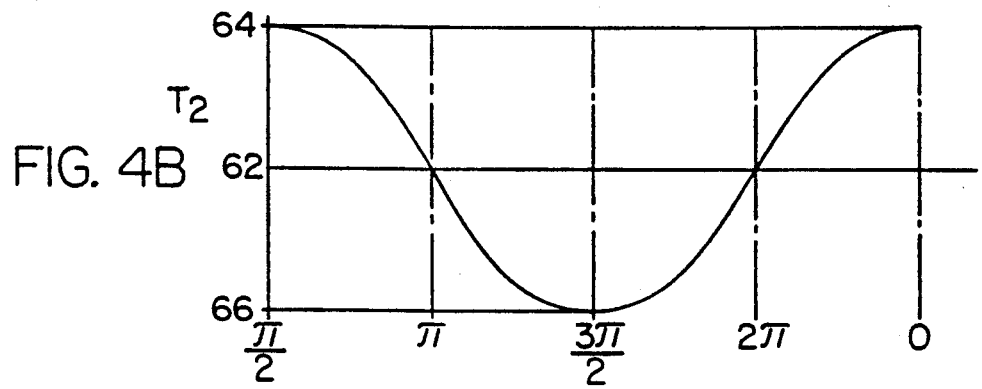
Figure 4C:
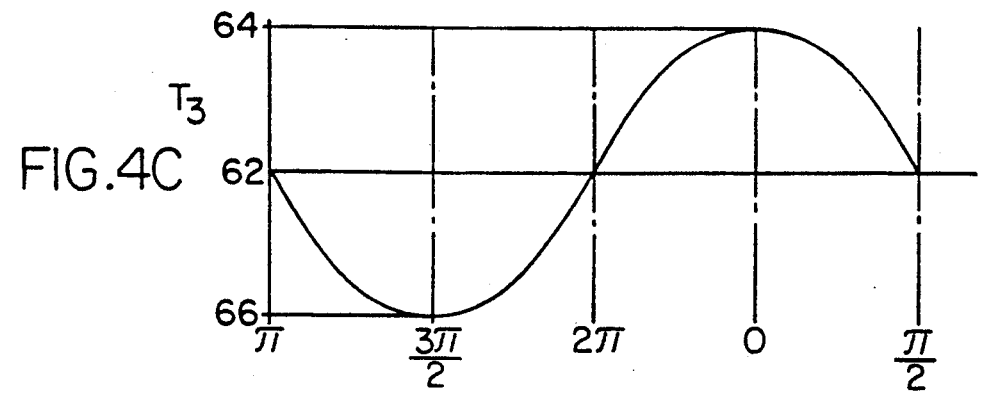
Figure 4D:
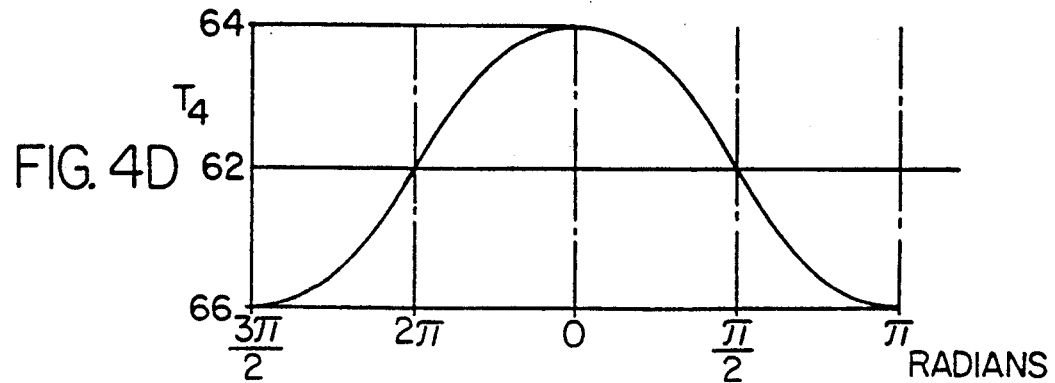
Figure 5A:
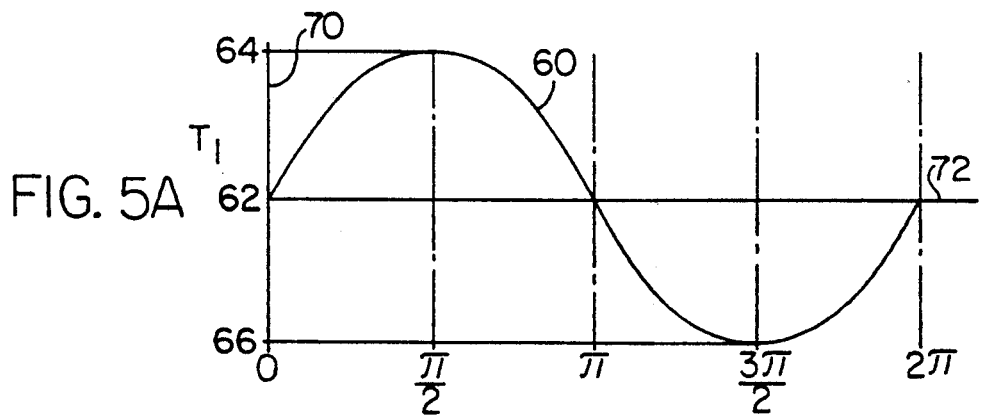
FIGS. 5A–5D show a wave representing the magnitude of the magnetic flux attributable to a phase in a finitely long TLIM as a function of time.
Figure 5B:
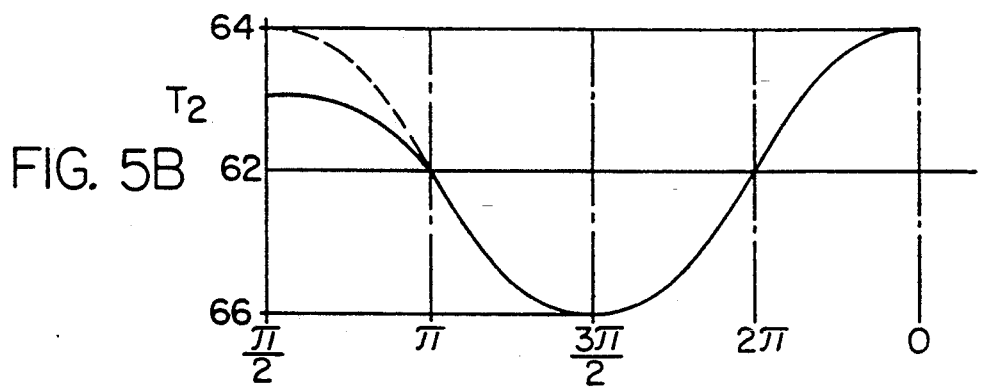
Figure 5C:
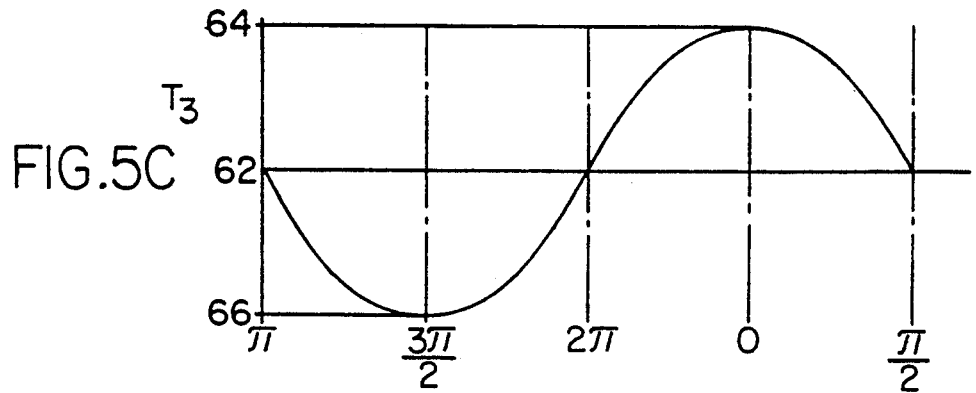
Figure 5D:
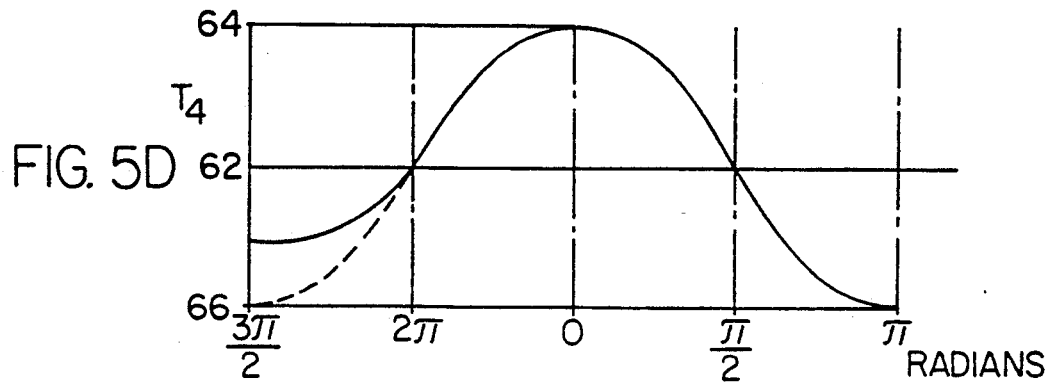

FIGS. 3 and 3A show winding arrangements for a two pole motor powered by three phase AC current with a "q" equal to three. FIG. 3, in particular, shows a conventional coil arrangement that can be described as UUUVVVWWW$\overline{\text{UUU}}$$\overline{\text{VVV}}$$\overline{\text{WWW}}$. FIG. 3A, on the other hand, shows a coil arrangement according to the present invention, wherein two of the three coils in the "U" phase 58 of the first pole are removed and repositioned to the second end 44 of the primary 12; i.e. UVVVWWW$\overline{\text{UUU}}$$\overline{\text{VVV}}$$\overline{\text{WWW}}$UU. In some configurations, the number of "U" coils remaining at the first end 42 of the primary 12 will not equal the number of "U" coils relocated to the second end 44 of the primary 12 because of an odd number of "U" coils in the first pole. Alternatively, half coils (i.e. coils with half the number of wires) may be used in motors having a "q" equal to an odd number.

In the operation of a TLIM, either an AC current, or a DC current controlled to act like an AC current, is introduced into the primary 12. When current is introduced into the coil(s) 20 of a particular phase of a particular pole 56, that phase, or the coil(s) 20 in that phase, is said to be "excited" and a magnetic field is created around the phase, perpendicular to the direction of the current traveling through the phase. The magnetic flux attributable to the excitation of a particular phase at a particular pole 56 will be the sum of the magnetic flux specifically emanating from the coil(s) 20 of that phase and the magnetic flux emanating from adjacent phases excited to a different extent at that point in time.

Referring to FIGS. 4A-4D, AC current travels naturally in a sinusoidal manner and can therefore easily be described in the form of a wave. The vertical axis 70 of the wave 60 measures the amplitude of the wave and the horizontal axis 72 denotes time in the form of unitless radians. In one period, a pure sine wave 60 like that shown in FIGS. 4A-4D, will change in magnitude from zero magnitude 62 at zero radians, to one full unit of amplitude 64 at $\pi/2$ radians, back to zero magnitude 62 at $\pi$ radians, down to a negative full unit of amplitude 66 at $3\pi/2$ radians, and finally back to zero magnitude 62 at $2\pi$ radians. The magnitude of magnetic flux attributable to a particular phase in an infinitely long TLIM can be described as a pure sine wave. In an infinitely long TLIM, the magnetic flux attributable to a particular phase consists of flux emanating from the coil(s) of that phase and contributions of flux emanating from adjacent phases excited to a different extent. Because there is no beginning and end in an infinitely long TLIM, each phase will always receive a flux contribution from the adjacent phases. At $\pi/2$ and $3\pi/2$ radians, therefore, the magnetic flux attributable to a particular phase will always be a full unit of amplitude. Moreover, the magnitude of flux, and therefore thrust, will remain constant at all points in time.

Referring to FIGS. 5A-5D, in a TLIM of finite length wound in a conventional manner, however, the "U" phase located closest to the first end of the primary will never reach a full unit of magnitude 64 at $\pi/2$ or at $3\pi/2$ radians because it does not receive the same amount of flux contribution as do phases in the middle of the TLIM (or any phase in an infinitely long TLIM). Consequently, a conventionally wound primary will produce full thrust at zero radians and at x radians because no contribution of flux from phases prior to the "U" phase is required at zero and x radians. At $\pi/2$ or at $3\pi/2$ radians, however, the primary will produce less than full thrust (full thrust is shown in dotted lines) because the "U" phase located closest to the first end of the primary receives no contribution of flux from prior phases. The difference in flux at these four points in time is what causes the fluctuation in thrust.

Referring to FIGS. 2A and 6A-6D, in the present invention, one half of the coils 20 of the "U" phase 58 closest to the first end 42 of the primary 12 (or a percentage of the coils as is shown in FIG. 3A) are moved to the second end 44 of the primary 12. Moving half the coils 20 causes the magnitude of flux attributable to the "U" phase closest to first end to decrease at every point in time. As a result, the "U" phase does not produce full thrust (shown as dotted lines in FIGS. 6A and 6C) at zero and at x radians, where it had before. The magnitude of thrust that is developed at zero and at $\pi$ radians (shown as solid lines in FIGS. 6A and 6C), however, is closer to the magnitude of thrust developed at $\pi/2$ or at $3\pi/2$ radians (see FIGS. 6B and 6D). Thus, the magnitude of thrust attributable to the "U" phase is made more consistent at every point in time. Placing the other half of the "U" phase at the second end 44 of the primary 12, creates the same phenomena at the second end 44. Overall, therefore, moving half the coils 20 of the "U" phase closest to the first end 42 to the second end 44 causes the magnetic field to diminish consistently at both ends of the primary 42,44, and thereby minimizes the thrust ripple. FIGS. 7A-7D show the magnitude of magnetic flux attributable to the "U" phase along the entire primary at 0, $\pi/2$, $\pi$, and $3\pi/2$ radians.

Although this invention has been shown and described with respect to the detailed embodiments thereof, it will be understood by those skilled in the art that various changes in form and detail thereof may be made without departing from the spirit and scope of the claimed invention.

We claim:

1. A linear motor driven by an electrical current having a number of phases, comprising:
    a secondary; and
    a primary, having a plurality of coils and thin laminations, each lamination having a width with a plurality of notches removed therefrom, a first end and a second end, and a length therebetween, wherein when said laminations are aligned, said notches collectively form channels for receiving said coils;
    wherein said plurality of coils are arranged in poles, each pole having a discrete number of coils corresponding to the number of phases in the current driving the linear motor, or a multiple thereof, and wherein a percentage of said coils corresponding to the phase closest to said first end, are positioned at said second end of said primary.

2. A linear motor according to claim 1, wherein said percentage of said coils corresponding to the phase closest to said first end, positioned at said second end of said primary, is equal to fifty percent.

3. A tubular linear motor driven by an electrical current having a number of phases, comprising:
    a secondary; and
    a primary, having a plurality of coils and thin laminations, each lamination having a width with a plurality of notches removed therefrom, a first end and a second end, and a length therebetween, wherein when said laminations are aligned, said notches collectively form channels for receiving said coils;
    wherein said plurality of coils are arranged in poles, each pole having a discrete number of coils corresponding to the number of phases in the current driving the linear motor, or a multiple thereof, and wherein a percentage of said coils corresponding to the phase closest to said first end, are positioned at said second end of said primary.

4. A tubular linear motor according to claim 3, wherein said percentage of said coils corresponding to the phase closest to said first end, positioned at said second end of said primary, is equal to fifty percent.

5. A method for arranging the primary coils of a tubular linear motor driven by an electrical current having a number of phases, comprising the steps of:
    providing a primary having a plurality of coils and thin laminations, each lamination having a width with a plurality of notches removed therefrom, a first end and a second end, and a length therebetween, wherein when said laminations are aligned, said notches collectively form channels for receiving said coils;
    arranging said coils in poles, each pole having a discrete number of coils corresponding to the number of phases in the current driving the linear motor, or a multiple thereof; and
    positioning a percentage of said coils corresponding to the phase closest to said first end at said second end of said primary.

6. A tubular linear motor primary comprising:
- a body, having a plurality of notches disposed sequentially therein from a first notch to a last notch; and
- a plurality of coils, each of said coils being disposed within a notch, each of said coils capable of creating a magnetic field of a given magnitude, a first coil disposed in said first notch and a second coil disposed in said last notch, said first and second coils each having a magnitude of a percentage less than one hundred percent of said given magnitude.

7. A tubular linear motor primary comprising:
- a body, having a plurality of notches disposed sequentially therein from a first notch to a last notch; and
- a plurality of coils, each of said coils being disposed within a notch, each of said coils capable of creating a magnetic field of a given magnitude, a coil disposed in said first notch, said coil having a magnitude of a percentage less than one hundred percent of said given magnitude.

* * * * *